United States Patent
Hu

(10) Patent No.: US 12,216,348 B2
(45) Date of Patent: Feb. 4, 2025

(54) DISPLAY DEVICE

(71) Applicant: Guangzhou China Star Optoelectronics Semiconductor Display Technology Co., Ltd., Guangdong (CN)

(72) Inventor: Xiaobin Hu, Guangdong (CN)

(73) Assignee: GUANGZHOU CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/756,684

(22) PCT Filed: May 25, 2022

(86) PCT No.: PCT/CN2022/094919
§ 371 (c)(1),
(2) Date: May 31, 2022

(87) PCT Pub. No.: WO2023/206678
PCT Pub. Date: Nov. 2, 2023

(65) Prior Publication Data
US 2024/0201530 A1    Jun. 20, 2024

(30) Foreign Application Priority Data
Apr. 27, 2022 (CN) .......................... 202210455396.3

(51) Int. Cl.
G02F 1/1333 (2006.01)
G02F 1/1343 (2006.01)

(52) U.S. Cl.
CPC .. G02F 1/133345 (2013.01); G02F 1/134372 (2021.01)

(58) Field of Classification Search
CPC ......... G02F 1/133345; G02F 1/134372; G02F 1/134309
See application file for complete search history.

(56) References Cited

U.S. PATENT DOCUMENTS

| 2007/0182874 | A1* | 8/2007 | Kamijima | ............ G09G 3/3611 349/44 |
| 2019/0086740 | A1* | 3/2019 | Bae | ................... G02F 1/133345 |
| 2023/0194935 | A1* | 6/2023 | Fukaya | ............. G02F 1/133345 349/56 |

FOREIGN PATENT DOCUMENTS

| CN | 101211072 A | 7/2008 |
| CN | 101995707 A | 3/2011 |

(Continued)

OTHER PUBLICATIONS

Chinese Office Action issued in corresponding Chinese Patent Application No. 202210455396.3 dated Jun. 29, 2023, pp. 1-6.

(Continued)

*Primary Examiner* — Mariam Qureshi

(57) ABSTRACT

A display device is provided. A liquid crystal display panel has a first display area and a second display area. When the display device displays, a brightness of the first display area is lower than a brightness of the second display area. The liquid crystal display panel includes a pixel electrode, a common electrode, and an insulating layer disposed between the pixel electrode and the common electrode. A thickness of at least part of the insulating layer in the first display area is greater than a thickness of at least part of the insulating layer in the second display area.

20 Claims, 4 Drawing Sheets

(56) References Cited

FOREIGN PATENT DOCUMENTS

| | | |
|---|---|---|
| CN | 102375277 A | 3/2012 |
| CN | 102402039 A | 4/2012 |
| CN | 103295959 A | 9/2013 |
| CN | 103869558 A | 6/2014 |
| CN | 104122701 A | 10/2014 |
| CN | 104882448 A | 9/2015 |
| CN | 105842939 A | 8/2016 |
| CN | 107507838 A | 12/2017 |
| CN | 209674155 U | 11/2019 |
| CN | 113504681 A | 10/2021 |
| JP | 2010230744 A | 10/2010 |
| KR | 20020017316 A | 3/2002 |

OTHER PUBLICATIONS

International Search Report in International application No. PCT/CN2022/094919, mailed on Dec. 15, 2022.
Written Opinion of the International Search Authority in International application No. PCT/CN2022/094919, mailed on Dec. 15, 2022.

* cited by examiner

DISPLAY DEVICE

FIELD OF INVENTION

The present disclosure relates to the technical field of display technology, and particularly, to a display device.

BACKGROUND OF INVENTION

Liquid crystal display (LCD) has many advantages such as thin body, power saving, no radiation, etc., and has been widely applied in such as LCD TV, mobile phone, personal digital assistant (PDA), digital camera, computer screen, or notebook computer screen, etc. The advantages described above make the liquid crystal display play an important role in the field of flat panel display.

At present, a horizontal electric field display mode such as fringe field switching (FFS) have the advantage of large viewing angles. However, the horizontal electric field display modes such as fringe field switching still have the problem that the light transmittance needs to be improved.

Technical Problem

The object of the present disclosure is to provide a display device to enhance a light transmittance of the display device.

SUMMARY OF INVENTION

Technical Solution

In one aspect, the present disclosure provides a display device. The display device comprises a liquid crystal display panel and a backlight module located on a light incident side of the liquid crystal display panel. The liquid crystal display panel has a first display area and a second display area. When the display device displays, a brightness of the first display area is lower than a brightness of the second display area. The liquid crystal display panel comprises:
  a pixel electrode:
  a common electrode electrically insulated from the pixel electrode; and
  an insulating layer disposed between the pixel electrode and the common electrode. A thickness of at least part of the insulating layer located in the first display area is greater than a thickness of at least part of the insulating layer located in the second display area.

In another aspect, the present disclosure provides a display device. The display device comprises a first display area and a second display area. The display device comprises a liquid crystal display panel. The liquid crystal display panel comprises:
  a first substrate:
  a second substrate disposed opposite to the first substrate, wherein the second substrate has a bearing surface close to the first substrate;
  a liquid crystal layer disposed between the first substrate and the second substrate, wherein the liquid crystal layer comprises a plurality of liquid crystal molecules:
  a pixel electrode disposed on the bearing surface of the second substrate:
  a common electrode disposed on the bearing surface of the second substrate, wherein the common electrode is electrically insulated from the pixel electrode and is used for forming a driving electric field with the pixel electrode for driving a deflection of the plurality of the liquid crystal molecules, and wherein a horizontal electric field component of the driving electric field in the first display area is lower than a horizontal electric field component of the driving electric field in the second display area, and a direction of the horizontal electric field component is parallel to the bearing surface of the second substrate; and
  an insulating layer disposed between the pixel electrode and the common electrode, wherein a thickness of at least part of the insulating layer located in the first display area is greater than a thickness of at least part of the insulating layer located in the second display area.

Beneficial Effects

The present disclosure provides a display device. A horizontal electric field component of a driving electric field in a first display area is lower than a horizontal electric field component of the driving electric field in a second display area, so that a horizontal electric field force on the liquid crystal molecules in the first display area is less than a horizontal electric field force on the liquid crystal molecules in the second display area. A light transmittance of a light emitted by a backlight module in the first display area of the liquid crystal display panel is less than a light transmittance of a light emitted by the backlight module in the second display area. When the display device displays, a brightness of the first display area is lower than a brightness of the second display area. Since a thickness of at least part of an insulating layer in the first display area is greater than a thickness of at least part of the insulating layer in the second display area, a horizontal electric field component of the driving electric field formed by the pixel electrode and the common electrode in the second display area is further higher than a horizontal electric field component of the driving electric field formed in the first display area, and a light transmittance of the second display area is further increased, thereby enhancing an overall brightness of the display device when displaying. In addition, since a thickness of at least part of the insulating layer located in the first display area is greater than a thickness of at least part of the insulating layer located in the second display area, a voltage required to maximize a brightness of the liquid crystal display panel may also be reduced. It is also beneficial to reduce a spacing distance between a pixel electrode and a common electrode in the second display area, resulting in an increase in a formed storage capacitance, so that when a charging rate is reduced, the storage capacitance formed between the pixel electrode and the common electrode in the first display area is reduced which allows the charging rate to be increased, so as to ensure that the display device as a whole has a suitable storage capacitance, thereby ensuring a proper charging rate.

DETAILED DESCRIPTION OF PREFERRED EMBODIMENTS

The technical solutions in the embodiments of the present disclosure will be clearly and completely described below with reference to the accompanying drawings in the embodiments of the present disclosure. Obviously, the described embodiments are only a part of the embodiments of the present disclosure, but not all of the embodiments. Based on the embodiments in the present disclosure, all other embodiments obtained by those skilled in the art without creative efforts shall fall within the claimed scope of the present disclosure.

Figure 1:
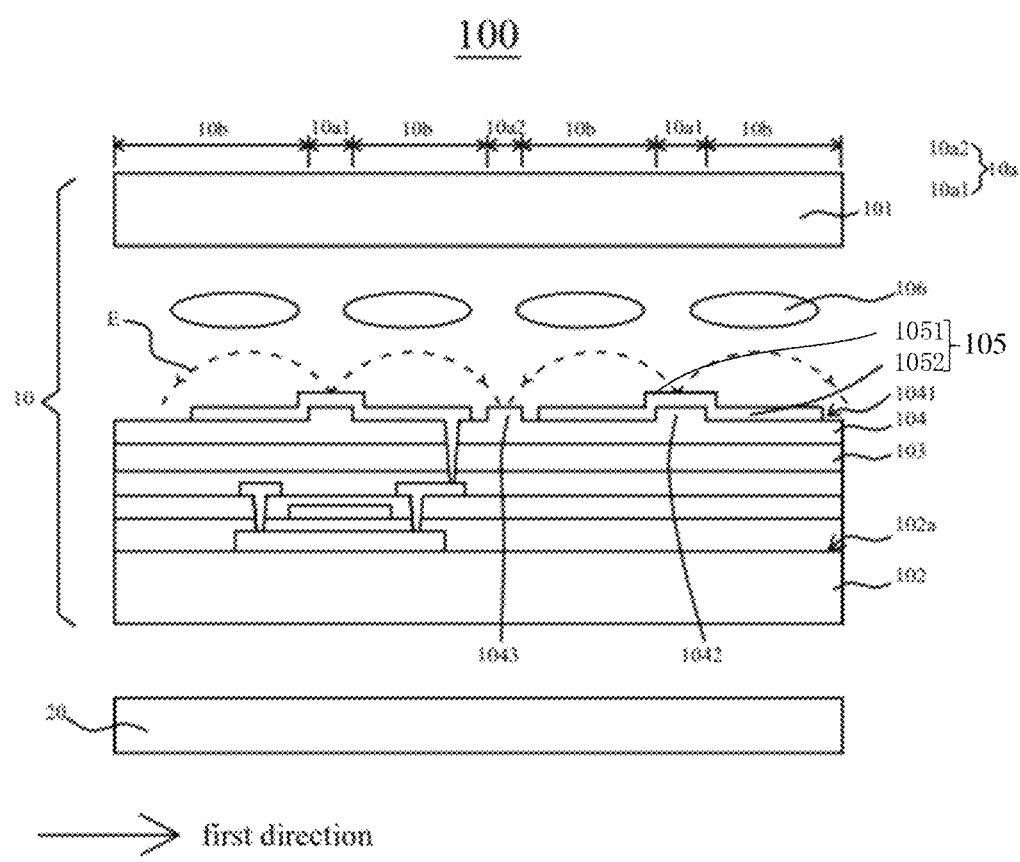
FIG. 1 is a schematic cross-sectional view of a display device according to a first embodiment of the present disclosure.
Figure 2:
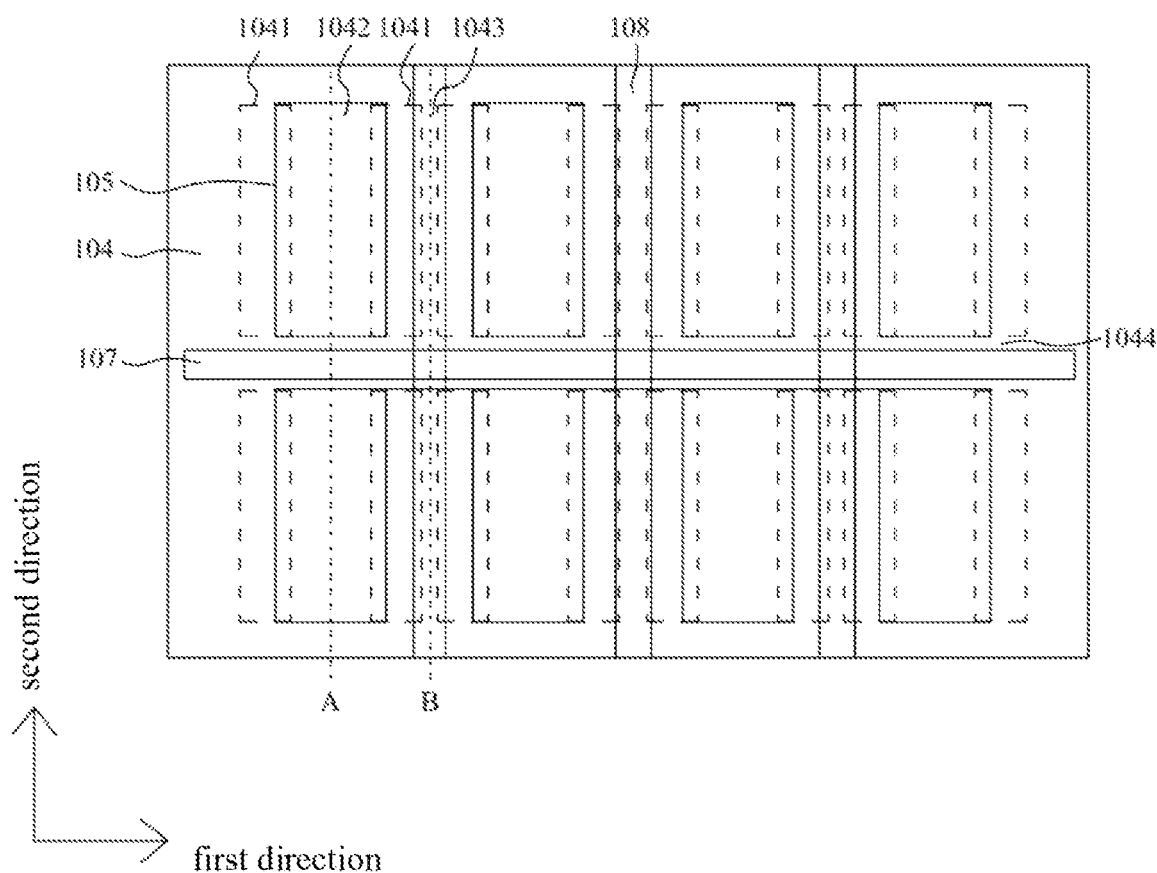
FIG. 2 is a first plan view of a pixel electrode, a passivation layer, data lines, and scan lines of the display device shown in FIG. 1.

Please refer to FIG. 1 and FIG. 2. FIG. 1 is a schematic cross-sectional view of a display device according to a first embodiment of the present disclosure. FIG. 2 is a first plan view of a pixel electrode, a passivation layer, data lines, and scan lines of the display device shown in FIG. 1. The display device 100 comprises a liquid crystal display panel 10 and a backlight module 20. The backlight module 20 is located on a light incident side of the liquid crystal display panel 10.

In the present embodiment, the backlight module 20 is used to emit backlight. The backlight module 20 may be any one of a direct type backlight module or an edge type backlight module.

In the present embodiment, the liquid crystal display panel 10 comprises a first substrate 101, a second substrate 102, an active layer, a gate insulating layer, a gate layer, an interlayer insulating layer, a source-drain electrode layer, a planarization layer, a common electrode 103, a passivation layer 104, a plurality of pixel electrodes 105, and a liquid crystal layer.

In one embodiment, the first substrate 101 and the second substrate 102 are disposed opposite to each other. The second substrate 102 has a flat bearing surface 102a. The first substrate 101 and the second substrate 102 are both glass substrates.

The liquid crystal layer is disposed between the first substrate 101 and the second substrate 102. The liquid crystal layer comprises a plurality of liquid crystal molecules 106.

The active layer is disposed on the bearing surface 102a of the second substrate 102. A preparation material of the active layer is any one of metal oxide, low temperature polysilicon or amorphous silicon.

The gate insulating layer covers the active layer and the bearing surface 102a of the second substrate 102. A thickness of the gate insulating layer is from 1500 angstroms to 4000 angstroms. A preparation material of the gate insulating layer is selected from at least one of silicon nitride or silicon oxide.

The gate layer is disposed on a surface of the gate insulating layer away from the active layer. The gate layer comprises a gate electrode and a scan line 107. The gate electrode is disposed corresponding to the active layer, and the scan line 107 extends along a first direction. A preparation material of the gate layer is selected from at least one of molybdenum, aluminum, titanium, copper, and silver.

The interlayer insulating layer covers the gate layer and the gate insulating layer. A thickness of the interlayer insulating layer is from 2000 angstroms to 5000 angstroms. A preparation material of the interlayer insulating layer is selected from at least one of silicon nitride or silicon oxide.

The source-drain electrode layer is disposed on one side of the interlayer insulating layer away from the gate layer. The source-drain electrode layer comprises a source electrode, a drain electrode, and a data line 108. The data line 108 is connected to the source electrode, and the data line 108 extends along a second direction. A width of the data line 108 is less than a width of the scan line 107. The second direction intersects with the first direction. Specifically, the first direction is perpendicular to the second direction. A preparation material of the source-drain electrode layer is selected from at least one of molybdenum, aluminum, titanium, copper, and silver.

The planarization layer covers the source-drain electrode layer and the interlayer insulating layer. A thickness of the planarization layer is from 0.5 μm to 2 μm. A preparation material of the planarization layer may be any one of polyimide or polyacrylate.

The common electrode 103 is entirely disposed on the planarization layer. A preparation material of the common electrode 103 is selected from any one of indium tin oxide or indium zinc oxide.

A plurality of pixel electrodes 105 are disposed on one side of the common electrode 103 away from the second substrate 102. The plurality of pixel electrodes 105 are electrically connected to the drain electrode and are electrically insulated from the common electrode 103. A preparation material of the pixel electrode 105 is any one of indium tin oxide or indium zinc oxide.

A shape of each pixel electrode 105 is a rectangle, and the pixel electrode 105 is a single-domain pixel electrode. That is, a plurality of slits (not shown) of the pixel electrode 105 extend in the same direction.

The plurality of pixel electrodes 105 are arranged in an array along the first direction and the second direction. There is a gap between the two adjacent pixel electrodes 105 in the first direction. The data lines 108 are arranged between two rows of the adjacent pixel electrodes 105 in the first direction. There is a gap between the two adjacent pixel electrodes 105 in the second direction. The scan lines 107 are arranged between two rows of the adjacent pixel electrodes 105 in the second direction.

It can be understood that the pixel electrode 105 may also be a dual-domain pixel electrode. A shape of the pixel electrode 105 may also be a V-shape. Positions of the plurality of pixel electrodes 105 and positions of the common electrode 103 may be interchanged.

The liquid crystal display panel 10 has a first display area 10a and a second display area 10b. The first display area 10a comprises a first display dark area 10a1 and a second display dark area 10a2. The second display area 10b is a display bright area. The first display dark area 10a1 corresponds to a middle area of one pixel electrode 105 in the first direction, and the second display dark area 10a2 corresponds to a middle area of a gap between the two adjacent pixel electrodes 105 in the first direction.

In the first direction, a plurality of first display dark areas 10a1 and a plurality of second display dark areas 10a2 are one-to-one alternately disposed. One of the first display dark areas 10a1 is disposed between the two adjacent second display areas 10b. One of the second display dark areas 10a2 is disposed between the two adjacent second display areas 10b.

It should be noted that the middle area of the pixel electrode 105 in the first direction may be a location where a line A is located or may be a location where the line A is located and a nearby location thereof. A middle area at the gap between the two adjacent pixel electrodes 105 in the first direction may be a location where a line B is located or may be a location where the line B is located and a nearby location thereof.

A driving electric field E for driving the plurality of liquid crystal molecules 106 to deflect is formed between the plurality of pixel electrodes 105 and the common electrode 103. In one embodiment, a horizontal electric field component of the driving electric field E in the first display area 10a is lower than a horizontal electric field component of the driving electric field E in the second display area 10b. A direction of the horizontal electric field component is parallel to the bearing surface 102a of the second substrate 102.

Specifically, since the pixel electrode 105 is a symmetrical rectangle, the driving electric field of the first display dark area 10a1 is 0 or tends to 0, and the horizontal component of the driving electric field of the second display dark area 10a2 cancels and becomes 0 or tends to 0. As a result, the plurality of liquid crystal molecules 106 in the first display dark area 10a1 and the second display dark area 10a2 are hardly deflected, while the liquid crystal molecules 106 in the second display area 10b are deflected under an action of a larger driving electric field. When the display device 100 displays, a brightness of the first display dark area 10a1 and a brightness of the second display dark area 10a2 is lower than a brightness of the second display area 10b. The first display dark area 10a1 and the second display dark area 10a2 are both in a dark state, while the second display area 10b is in a bright state.

It should be noted that when the shape of the pixel electrode 105 is other than a rectangle, the liquid crystal display panel 10 will still have a display dark area and a display bright area when displaying. When the display device displays, a brightness of the display dark area is lower than a brightness of the display dark area. The display dark area may deviate from the middle area of the pixel electrode 105 in the first direction or may also deviate from the middle area of the gap between the two adjacent pixel electrodes 105 in the first direction. In addition, when the display device 100 displays, the dark state exhibited by the first display dark area 10a1 and the second display dark area 10a2 and the bright state exhibited by the second display area 10b may be observed under a microscope.

The passivation layer 104 is disposed between the plurality of pixel electrodes 105 and the common electrode 103, and the passivation layer 104 is disposed on an entire surface. A thickness of the passivation layer 104 is from 3000 angstroms to 4000 angstroms. A preparation material of the passivation layer 104 is selected from at least one of silicon nitride or silicon oxide.

It should be noted that the pixel electrode 105, the common electrode 103, and the passivation layer 104 form a storage capacitor. The greater the thickness of the passivation layer 104, the smaller the storage capacitor and the higher the charging rate of the liquid crystal display panel 10. On the contrary, the lesser the thickness of the passivation layer 104, the larger the storage capacitance and the lower the charging rate of the liquid crystal display panel 10. In addition, the greater the thickness of the passivation layer 104, the greater the spacing distance between the pixel electrode 105 and the common electrode 103, the greater the maximum voltage value required to achieve the maximum display brightness of the liquid crystal display panel 10, and the lower the horizontal component of the driving electric field formed between the pixel electrode 105 and the common electrode 103.

A thickness of at least part of the passivation layer 104 located in the first display area 10a (the first display dark area 10a1 and the second display dark area 10a2) is greater than a thickness of at least part of the passivation layer 104 located in the second display area 10b, so that a spacing distance between the at least part of the pixel electrodes 105 and the common electrode 103 in the first display area 10a is greater than a spacing distance between the at least part of the pixel electrodes 105 and the common electrode 103 in the second display area 10b. Moreover, the horizontal component of the driving electric field formed between the at least part of the pixel electrodes 105 and the common electrode 103 in the first display area 10a is further lower than the horizontal component of the driving electric field formed between the at least part of the pixel electrodes 105 and the common electrode 103 in the second display area 10b. At least part of the liquid crystal molecules 106 in the first display area 10a continue to maintain in a non-deflected state. At least part of the liquid crystal molecules 106 in the second display area 10b are more fully deflected in a horizontal plane parallel to the bearing surface 102a. A light transmittance of the first display area 10a continues to maintain low, while a light transmittance of the second display area 10b is further enhanced. The first display area 10a continues to maintain in a dark state, and the brightness of the second display area 10b is further enhanced, thereby enhancing an overall light transmittance and brightness of the display device 100.

In addition, since the thickness of at least part of the passivation layer 104 located in the first display area 10a is greater than the thickness of at least part of the passivation layer 104 located in the second display area 10b, a voltage required for the liquid crystal display panel to achieve maximum brightness may also be reduced. It is also beneficial to reduce the storage capacitance of the first display area 10a and increase the charging rate when the storage capacitance of the second display area 10b is increased and the charging rate is reduced, thereby balancing the larger storage capacitance of the second display area 10b. It may ensure that the display device 100 as a whole has a suitable storage capacitance, thereby ensuring a suitable charging rate.

The passivation layer 104 comprises at least one groove 1041 defined in the second display area 10b. A part of the pixel electrodes 105 is disposed in the groove 1041, and/or at least a part of the gap between two adjacent pixel electrodes 105 in the first direction overlaps with at least a part of the groove 1041, so that the thickness of the passivation layer 104 in the second display area 10b is less than the thickness of the passivation layer 104 in the first display area 10a. It further allows the horizontal component of the driving electric field E formed between the plurality of pixel electrodes 105 and the common electrode 103 is further enhanced in the second display area, which is beneficial to further enhance the light transmittance of the second display area 10b. A depth of the groove 1041 is less than the thickness of the passivation layer 104.

Specifically, one groove 1041 overlaps with a part of one pixel electrode 105 and a part of the gap between the two adjacent pixel electrodes 105 in the first direction. Two grooves 1041 are defined in two opposite sides of the middle area of one pixel electrode 105, and two grooves 1041 are defined in two opposite sides of the middle area of the gap between the two adjacent pixel electrodes 105 in the first direction.

A size of one groove 1041 in the second direction is less than or equal to a size of the pixel electrode 105 in the second direction. Specifically, the size of the groove 1041 in the second direction is equal to the size of the pixel electrode 105 in the second direction, which maximizes the light transmittance of the second display area 10b.

The passivation layer 104 comprises a first protrusion 1042 and a second protrusion 1043. The first protrusion 1042 is located between the two adjacent grooves 1041 in the first direction, and the second protrusion 1043 is located between the two adjacent grooves 1041 in the first direction and located between adjacent two first protrusion 1042. Orthographic projections of two pixel electrodes 105 adjacent to the second protrusion 1043 on the common electrode 103 are not overlapped with an orthographic projection of this second protrusion 1043 on the common electrode 103. A middle part 1051 of the pixel electrode 105 extending continuously in the first direction is disposed on the first protrusion 1042, and a middle part of the gap between the two adjacent pixel electrodes 105 in the first direction is disposed on the second protrusion 1043, so that a thickness of the passivation layer 104 of the first display dark area 10a1 and a thickness of the passivation layer 104 of the second display dark area 10a2 are larger than a thickness of the passivation layer of the second display area 10b. Further, the pixel electrode 105 also includes side parts 1052 in contact with the middle part 1051. The side parts 1052 are arranged in respective grooves 1041.

It should be noted that, by thinning the passivation layer 104 to prepare a plurality of grooves 1041, the passivation layer 104 between the two adjacent grooves 1041 in the first direction may form the first protrusion 1042 or the second protrusion 1043 without being thinned. It is also possible to form an insulating layer on the passivation layer 104 of the first display dark area 10a1 and the second display dark area 10a2, so that a thickness of the insulating layer between the pixel electrode 105 and the common electrode 103 of the first display dark area 10a1 and the second display dark area 10a2 is thickened.

A ratio of the size of the first protrusion 1042 in the first direction to a size of the pixel electrode 105 in the first direction is greater than 0 and less than or equal to ½, for example, ⅙, ⅕, ¼, ⅓, or ½. A size of the first protrusion 1042 in the second direction is equal to the size of the pixel electrode 105 in the second direction.

A ratio of the size of the second protrusion 1043 in the first direction to a size of the gap between the two adjacent pixel electrodes 105 in the first direction is greater than 0 and less than or equal to ½, for example, ⅙, ⅕, ¼, ⅓, or ½. A size of the second protrusion 1043 in the second direction is equal to the size of the pixel electrode 105 in the second direction.

The two adjacent grooves 1041 in the second direction are defined in two opposite sides of the scan line 107. The passivation layer 104 comprises a third protrusion 1044, and one third protrusion 1044 is located between the two adjacent grooves 1041 in the second direction.

It should be noted that when the common electrode 103 is located on one side of the pixel electrode 105 away from the second substrate 102, the two adjacent grooves 1041 in the second direction are defined in two opposite sides of the scan line 107. The third protrusion 1044 is located between the two adjacent grooves 1041 in the second direction, and the third protrusion 1044 is located above the scan line 107, so that a spacing distance between the common electrode 103 and the scan line 107 is larger, and a parasitic capacitance formed by the front overlapping of the common electrode 103 and the scan line 107 is smaller.

Figure 3:
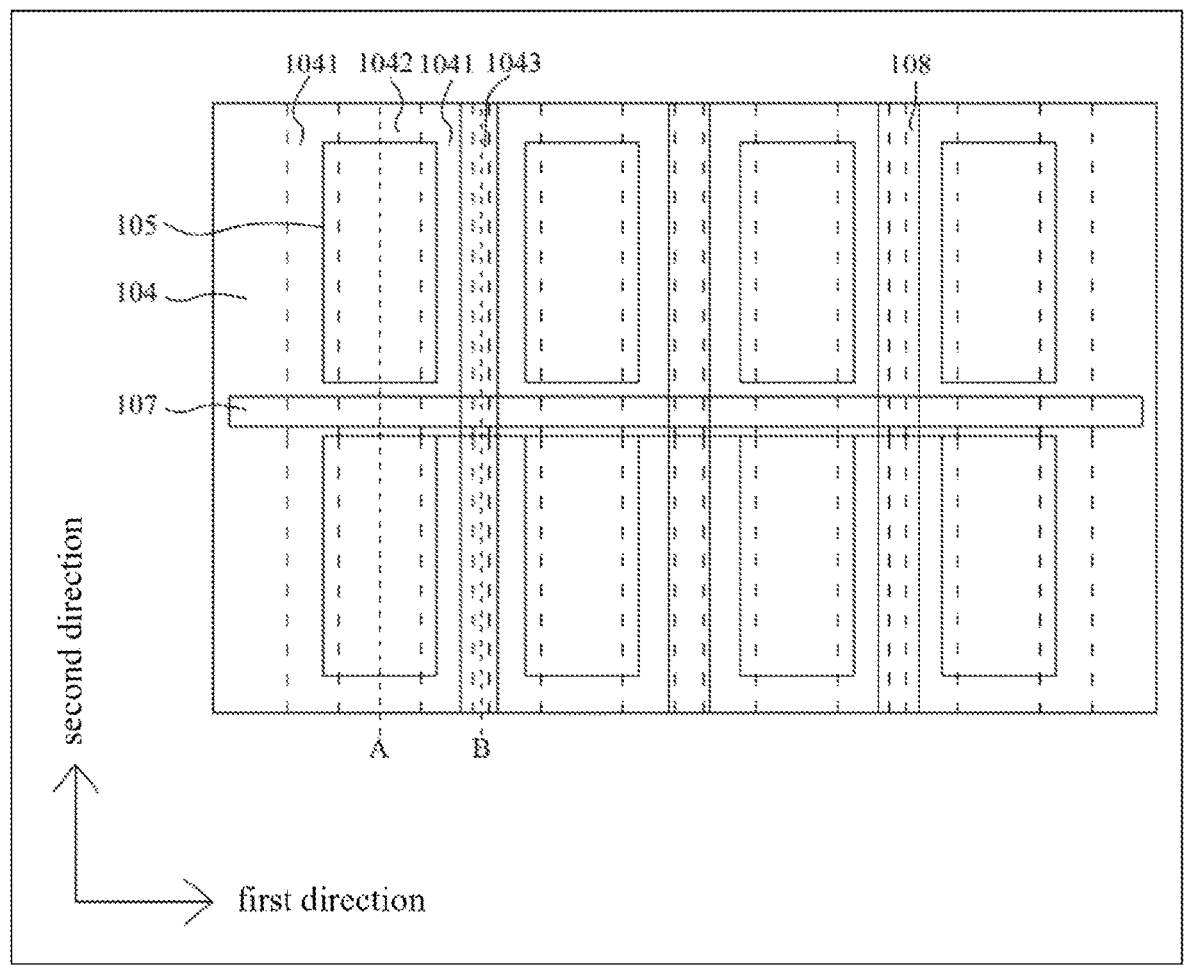
FIG. 3 is a second plan view of the pixel electrode, the passivation layer, the data lines, and the scan lines of the display device shown in FIG. 1.

Please refer to FIG. 3, which is a second plan view of the pixel electrode, the passivation layer, the data lines, and the scan lines of the display device shown in FIG. 1. In FIG. 3, the two adjacent grooves 1041 in the second direction communicate with each other. That is, one groove 1041 is arranged corresponding to a row of pixel electrodes 105 disposed side by side in the second direction.

When the common electrode 103 is located on one side of the pixel electrode 105 away from the second substrate 102, the two adjacent grooves 1041 in the second direction communicates with each other, and a spacing distance between the common electrode 103 and the scan line 107 is smaller, resulting in a larger parasitic capacitance between the common electrode 103 and the scan line 107.

Figure 4:
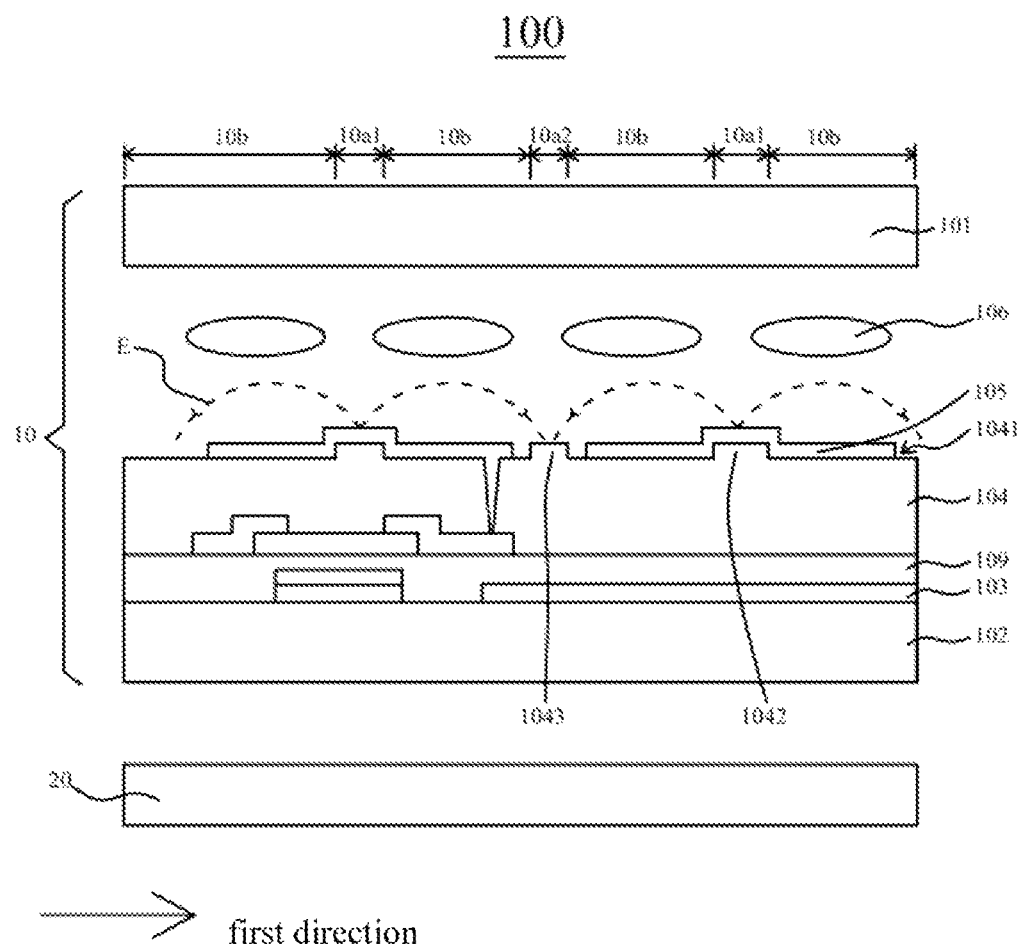
FIG. 4 is a schematic cross-sectional view of the display device according to a second embodiment of the present disclosure.

Please refer to FIG. 4, which is a schematic cross-sectional view of the display device according to a second embodiment of the present disclosure. The display device 100 shown in FIG. 4 is basically similar to the display device 100 shown in FIG. 1, except that a gate insulating layer 109 and a passivation layer 104 are disposed between the common electrode 103 and the plurality of pixel electrodes 105. The gate insulating layer 109 is located between the passivation layer 104 and the common electrode 103, and the plurality of pixel electrodes 105 are disposed on one side of the passivation layer 104 away from the second substrate 102.

In the present embodiment, the groove 1041 is defined on the passivation layer 104, and a depth of the groove 1041 is less than or equal to a thickness of the passivation layer 104.

In other embodiments, the groove 1041 may also be defined on the passivation layer 104 and the gate insulating layer 109, and a depth of the groove 1041 is less than a sum of the thicknesses of the passivation layer 104 and a thickness of the gate insulating layer 109.

The descriptions of the above embodiments are merely used to help understand the technical solutions of the present disclosure and its core concept. Those of ordinary skill in the art should understand that the technical solutions described in the foregoing embodiments can still be modified, or some of the technical features can be equivalently replaced. These modifications or replacements do not make the essence of the corresponding technical solutions deviate from the scope of the technical solutions of the embodiments of the present disclosure.

What is claimed is:

1. A display device, comprising a liquid crystal display panel and a backlight module located on a light incident side of the liquid crystal display panel, wherein the liquid crystal display panel has a first display area and a second display area, when the display device displays, a brightness of the first display area is lower than a brightness of the second display area, and wherein the liquid crystal display panel comprises:
   a pixel electrode;
   a common electrode electrically insulated from the pixel electrode; and
   an insulating layer disposed between the pixel electrode and the common electrode, wherein a thickness of at least part of the insulating layer located in the first display area is greater than a thickness of at least part of the insulating layer located in the second display area;
   wherein a plurality of the pixel electrodes are arranged in an array along a first direction and a second direction, and the first direction intersects with the second direction; wherein the insulating layer comprises at least one groove defined in the second display area, first protrusions each of which is located between two adjacent of the at least one groove in the first direction, and second protrusions each of which is located between adjacent two of the first protrusions; and the pixel electrode comprises a middle part extends continuously in the first direction, and side parts in contact with the middle part; wherein the middle part is arranged on the first protrusion, and the side parts are arranged in respective ones of the at least one groove;

wherein an orthographic projection of the second protrusion on the common electrode is not overlapped with orthographic projections of two of the pixel electrodes adjacent to the second protrusion on the common electrode;

wherein the first protrusion has a same thickness as the second protrusion.

2. The display device according to claim 1, wherein the liquid crystal display panel further comprises a scan line extending along the first direction and a data line extending along the second direction, and the scan line is arranged between two rows of the adjacent pixel electrodes in the second direction; and wherein at least part of a gap between the two adjacent pixel electrodes in the first direction overlaps with at least part of the groove.

3. The display device according to claim 1, wherein the liquid crystal display panel further comprises a scan line extending along the first direction and a data line extending along the second direction, and the scan line is arranged between two rows of the adjacent pixel electrodes in the second direction; and wherein one of the grooves overlaps with a part of one of the pixel electrodes and a part of a gap between the two adjacent pixel electrodes in the first direction.

4. The display device according to claim 3, wherein a shape of the pixel electrode is a rectangle, and the first direction is perpendicular to the second direction; wherein a middle part of the gap between the two adjacent pixel electrodes in the first direction is arranged on the second protrusion.

5. The display device according to claim 4, wherein a ratio of a size of the first protrusion in the first direction to a size of the pixel electrode in the first direction is greater than 0 and less than or equal to ½, and a ratio of a size of the second protrusion in the first direction to a size of the gap between two adjacent pixel electrodes in the first direction is greater than 0 and less than or equal to ½.

6. The display device according to claim 4, wherein the two adjacent grooves in the second direction are defined in two opposite sides of the scan line, and wherein the insulating layer further comprises a third protrusion, and the third protrusion is located between the two adjacent grooves in the second direction.

7. The display device according to claim 6, wherein a size of the groove in the second direction is lesser than or equal to a size of the pixel electrode in the second direction.

8. The display device according to claim 4, wherein the two adjacent grooves in the second direction communicate with each other.

9. The display device according to claim 3, wherein the insulating layer comprises a passivation layer, the groove is defined on the passivation layer, and a depth of the groove is less than a thickness of the passivation layer.

10. The display device according to claim 3, wherein the insulating layer comprises a passivation layer and a gate insulating layer, the groove is defined on the passivation layer, and a depth of the groove is less than or equal to a thickness of the passivation layer.

11. The display device according to claim 3, wherein the insulating layer comprises a passivation layer and a gate insulating layer, the groove is defined on the passivation layer and the gate insulating layer, and a depth of the groove is less than a sum of a thicknesses of the passivation layer and a thickness of the gate insulating layer.

12. The display device according to claim 1, wherein a side of the first protrusion in the first direction is greater than a size of the second protrusion in the first direction.

13. A display device, comprising a first display area and a second display area, wherein the display device comprises a liquid crystal display panel, and the liquid crystal display panel comprises:

a first substrate;

a second substrate disposed opposite to the first substrate, wherein the second substrate has a bearing surface close to the first substrate;

a liquid crystal layer disposed between the first substrate and the second substrate, wherein the liquid crystal layer comprises a plurality of liquid crystal molecules;

a pixel electrode disposed on the bearing surface of the second substrate;

a common electrode disposed on the bearing surface of the second substrate, wherein the common electrode is electrically insulated from the pixel electrode and is used for forming a driving electric field with the pixel electrode for driving a deflection of the plurality of the liquid crystal molecules, and wherein a horizontal electric field component of the driving electric field in the first display area is lower than a horizontal electric field component of the driving electric field in the second display area, and a direction of the horizontal electric field component is parallel to the bearing surface of the second substrate; and an insulating layer disposed between the pixel electrode and the common electrode, wherein a thickness of at least part of the insulating layer located in the first display area is greater than a thickness of at least part of the insulating layer located in the second display area;

wherein a plurality of the pixel electrodes are arranged in an array along a first direction and a second direction, and the first direction intersects with the second direction; wherein the insulating layer comprises at least one groove defined in the second display area, first protrusions each of which is located between two adjacent of the at least one groove in the first direction, and second protrusions each of which is located between adjacent two of the first protrusions; and the pixel electrode comprises a middle part extends continuously in the first direction, and side parts in contact with the middle part; wherein the middle part is arranged on the first protrusion, and the side parts are arranged in respective ones of the at least one groove;

wherein an orthographic projection of the second protrusion on the common electrode is not overlapped with orthographic projections of two of the pixel electrodes adjacent to the second protrusion on the common electrode;

wherein the first protrusion has a same thickness as the second protrusion.

14. The display device according to claim 13, wherein the liquid crystal display panel further comprises a scan line extending along the first direction and a data line extending along the second direction, and the scan line is arranged between two rows of the adjacent pixel electrodes in the second direction; and wherein one of the grooves overlaps with a part of one of the pixel electrodes and a part of a gap between the two adjacent pixel electrodes in the first direction.

15. The display device according to claim 14, wherein a shape of the pixel electrode is a rectangle, and the first direction is perpendicular to the second direction; wherein
a middle part of the gap between the two adjacent pixel electrodes in the first direction is arranged on the second protrusion.

16. The display device according to claim 15, wherein a ratio of a size of the first protrusion in the first direction to a size of the pixel electrode in the first direction is greater than 0 and less than or equal to ½, and a ratio of a size of the second protrusion in the first direction to a size of the gap between two adjacent pixel electrodes in the first direction is greater than 0 and less than or equal to ½.

17. The display device according to claim 15, wherein the two adjacent grooves in the second direction are defined in two opposite sides of the scan line, and wherein the insulating layer further comprises a third protrusion, and the third protrusion is located between the two adjacent grooves in the second direction.

18. The display device according to claim 17, wherein a size of the groove in the second direction is lesser than or equal to a size of the pixel electrode in the second direction.

19. The display device according to claim 15, wherein the two adjacent grooves in the second direction communicate with each other.

20. The display device according to claim 14, wherein the insulating layer comprises a passivation layer, the groove is defined on the passivation layer, and a depth of the groove is less than a thickness of the passivation layer.

\* \* \* \* \*